(12) United States Patent
Augustinus et al.

(10) Patent No.: US 11,110,543 B2
(45) Date of Patent: Sep. 7, 2021

(54) LASER ENGRAVER WITH CALIBRATION SYSTEM

(71) Applicant: IAI industrial systems B.V., Veldhoven (NL)

(72) Inventors: Arnoud Augustinus, Eersel (NL); Jurgen Kremer, Breda (NL)

(73) Assignee: IAI industrial systems B.V., Veldhoven (NL)

( * ) Notice: Subject to any disclaimer, the term of this patent is extended or adjusted under 35 U.S.C. 154(b) by 314 days.

(21) Appl. No.: 16/278,594

(22) Filed: Feb. 18, 2019

(65) Prior Publication Data
US 2019/0262937 A1   Aug. 29, 2019

(30) Foreign Application Priority Data

Feb. 19, 2018   (EP) ..................................... 18157293

(51) Int. Cl.
*B23K 26/03* (2006.01)
*B23K 26/36* (2014.01)
(Continued)

(52) U.S. Cl.
CPC .......... *B23K 26/035* (2015.10); *B23K 26/032* (2013.01); *B23K 26/042* (2015.10);
(Continued)

(58) Field of Classification Search
CPC .. B23K 26/035; B23K 26/362; B23K 26/702; B23K 26/042; B23K 26/352; B41M 5/24;
(Continued)

(56) References Cited

U.S. PATENT DOCUMENTS

| 2005/0205778 A1 | 9/2005 | Kitai et al. |
| 2006/0138111 A1* | 6/2006 | Hillebrand ............. B23K 26/04 |
| | | 219/121.83 |

(Continued)

FOREIGN PATENT DOCUMENTS

| EP | 1097022 | 9/2003 |
| EP | 2256576 | 12/2010 |

(Continued)

OTHER PUBLICATIONS

Machine translation of Japan Patent No. 10-076,384, Feb. 2021.*
"European Application Serial No. 18157293.4, Extended European Search Report dated Sep. 21, 2018", 5 pgs.

*Primary Examiner* — Geoffrey S Evans
(74) *Attorney, Agent, or Firm* — Schwegman Lundberg & Woessner, P.A.

(57) ABSTRACT

A laser engraver having a laser, a camera, and a plate for holding a product, wherein an optical path of the laser is directed to the plate, an optical path of the camera is directed to the plate, and the optical path of the camera to the plate and the optical path of the laser to the plate are at least partially the same before and when hitting the plate. The laser engraver includes a controller and a comparator, wherein the controller is configured to have the laser engrave a predefined pattern at a predefined position on the product on the plate to form an engraved pattern on the product and have the camera capture a position of the engraved pattern, have the comparator compare the predefined position and the position captured by the camera to determine a difference therebetween, and use the difference to calibrate the laser.

20 Claims, 2 Drawing Sheets

(51) Int. Cl.
  *B23K 26/035* (2014.01)
  *B23K 26/362* (2014.01)
  *B44C 1/22* (2006.01)
  *B42D 25/435* (2014.01)
  *B23K 26/70* (2014.01)
  *B44B 3/00* (2006.01)
  *B23K 26/042* (2014.01)
  *B23K 26/352* (2014.01)
  *B42D 25/41* (2014.01)
  *B41M 5/24* (2006.01)
  *B41M 5/26* (2006.01)

(52) U.S. Cl.
  CPC .......... *B23K 26/352* (2015.10); *B23K 26/362* (2013.01); *B23K 26/702* (2015.10); *B42D 25/435* (2014.10); *B44B 3/009* (2013.01); *B44C 1/228* (2013.01); *B41M 5/24* (2013.01); *B41M 5/26* (2013.01); *B42D 25/41* (2014.10)

(58) Field of Classification Search
  CPC ........ B41M 5/26; B44C 1/228; B42D 25/435; B42D 25/41; B44B 3/009; G05B 2219/45041
  See application file for complete search history.

(56) References Cited

U.S. PATENT DOCUMENTS

| | | | |
|---|---|---|---|
| 2008/0078751 A1* | 4/2008 | Abrott | B23K 26/032 219/121.69 |
| 2008/0156778 A1* | 7/2008 | Lin | B23K 26/032 219/121.68 |
| 2009/0065488 A1* | 3/2009 | Hu | B23K 26/04 219/121.72 |
| 2010/0292947 A1* | 11/2010 | Buk | B23K 26/082 702/94 |
| 2011/0286478 A1* | 11/2011 | Green | B23K 26/0622 372/24 |
| 2012/0074107 A1 | 3/2012 | Berthe et al. | |
| 2016/0124026 A1* | 5/2016 | Mullen | H01J 37/244 324/403 |

FOREIGN PATENT DOCUMENTS

| | | | |
|---|---|---|---|
| EP | 2769800 | | 8/2014 |
| JP | 10076384 A | * | 3/1998 |
| WO | 2010005394 | | 1/2010 |

* cited by examiner

LASER ENGRAVER WITH CALIBRATION SYSTEM

CROSS-REFERENCE TO RELATED APPLICATIONS

This application claims priority to European Patent Application Serial Number 18157293.4, filed Feb. 19, 2018, the disclosure of which is incorporated by reference herein in its entirety.

FIELD OF THE INVENTION

The invention relates to a laser engraver and more particularly to a laser engraver with a calibration system for calibrating one or more parameters of the laser engraver, especially for calibrating the optical system and for calibrating the laser system.

BACKGROUND OF THE INVENTION

Laser engraver systems are used to engrave, perforate or mark products or objects. A laser is controlled and used to engrave products such as for instance plastic cards or passports. A visual or vision system is used for positioning and to monitor the progress of the laser engraving.

The calibration of the laser and the calibration of the visual system is carried out with the help of calibration cards and the calibration cards are measured. In a next step, the parameters of the laser and of the optical system are adjusted and the calibration is carried out with the new parameters and this process is repeated until a satisfactory result is achieved.

In EP2256576A1 a system for calibration of a laser engraver is described, wherein stored data in a memorization device is used to calibrate the laser engraver without the need of calibration cards, i.e. the calibration cards are the data stored in the memorization device.

In EP1097022B1 a method for calibrating a laser processing machine is described, wherein with the help of a calibration plate and a test plate imaging errors of the camera and optical setoffs of the laser are compensated.

SUMMARY OF THE INVENTION

Some applications require a high position precision of the engraved image in respect to a pre-printed or embossed structure. For these systems the stability of the alignment of the components in the engrave system (camera and laser) is crucial. Drift, instability and other sources of misalignment would result in a failure to create good perfectly aligned, features. If the feature requires a position accuracy of 10 μm or less over a 120 mm field, the requirements for the stability of the engraving system are extremely high, difficult and costly to achieve and very difficult to keep with tolerances over long periods of time (>0.5 to 1 year). Realising such stability would require special mechanical constructions and very stable components.

It is an object of the invention to calibrate a laser engraver without the need of calibration cards avoiding the disadvantages of the prior art. The object is achieved by the laser engraver according to the independent product claim and a method according to the independent method claim. Advantageous developments are defined in the dependent claims.

The object of the present invention is especially solved by a laser engraver comprising a laser and a camera and a plate for holding a product to be engraved, the plate comprising a reference grid, wherein an optical path of the laser is directed to the plate and an optical path of the camera is directed to the plate and the optical path of the camera to the plate and the optical path of the laser to the plate are at least partially the same before and when hitting the plate, a calibration system with a controller, and a comparator, wherein the controller is set up to use the reference grid of the plate to calibrate the camera and wherein the controller is set up to have the laser engrave a predefined pattern on a product on the plate and to have the (then calibrated) camera to capture the position of this engraved pattern and the controller is set up to have the comparator to compare the predefined or intended or theoretical position of the engraved pattern and the position according to the (calibrated) camera and to determine a difference between these two positions, wherein the controller is set up to use this difference to calibrate the laser.

A laser engraver or a laser engraving machine comprises three main parts: a laser, a controller, and a surface to be engraved or marked. The beam emitted from the laser allows the controller to trace patterns onto the surface. The controller direction, intensity, speed of movement, and spread of the laser beam aimed at the surface. The surface is picked to match what the laser can act on. Preferably, a laser table (or "X-Y table") is used. The laser is preferably fixed permanently to the side of the table and emits light towards a pair of movable mirrors so that every point of the table surface can be swept by the laser. At the point of engraving, the laser beam is preferably focused through a lens at the engraving surface, allowing very precise and intricate patterns to be traced out.

The laser engraver preferably comprises a camera or a visual system. The camera is preferably used to measure the position of pre-printed elements (fiducials, captions or other marks). Initially the position of the element is measured as a reference. In production, the position of the element is measured on each product and the displacement in respect to the reference (an offset) is used to correct the position of the laser engraving in order to ensure that the relation between laser and pre-print is constant.

A plate for holding a product to be engraved is used to position the product to be engraved. Preferably, the plate comprises holes for holding the product by vacuum and sucking air through these holes thus fixing the product. Since the positions of the holes is well known, these holes can serve as a reference grid and thus, the offset of the camera image with respect to these holes or with this reference grid defined by the holes can be determined and used to calibrate the camera.

An optical path of the laser is the optical path the beam propagates. This optical path can be defined by mirrors which reflect the beam and allow the beam to propagate along this optical path. The optical path of the camera is defined by lenses and mirrors and the optical path of the camera to the plate and the optical path of the laser to the plate are at least partially the same and coincide before and when hitting the plate. Thus, the laser beam and the optical path of the camera are identical at the end, preferably at the last optical element both optical paths pass before hitting the plate or the product, respectively. Preferably, the optical path of the camera and the laser are directed over at least one identical optical element (for instance a mirror, a lens, etc.). Thus, the drift or displacement of this optical element in the (mutual) optical path influences both the optical path of the laser and the camera in the same way. Most preferably, both optical paths are the same along more than one optical element, preferably along more than two optical elements, most preferably along more than three optical elements before hitting the target area on the plate or the product on the plate.

A calibration system with a controller is a system that allows both the laser and the optical system or camera to be calibrated.

The controller is set up to use the reference grid of the plate to calibrate the camera. This reference grid is most preferably the pattern of holes that are present in the plate to allow fixing the product on the plate by vacuum, i.e. by sucking air through these holes in order to hold the product on the plate. The position of these holes are well known and can be used to calibrate the optical system or the camera in a first step without the need of calibration cards or the like. In this embodiment, the controller is set up to use the pattern of holes as the reference grid of the plate—with no product on it—to calibrate the camera.

The controller is set up to have—in a second step—the laser engrave a predefined pattern on a product on the plate and to have the—then calibrated—camera to capture the position of this engraved pattern. Thus, the calibrated camera captures the picture of a first engraving on the real product. Preferably, the engraving makes use of the whole area of the product. The controller engraves this first engraved pattern according to coordinates given to the laser. However, the laser is not yet calibrated. Thus, there is an offset between the real position of the first engraved pattern according to the coordinates of the laser and the picture taken by the camera, wherein the camera is already calibrated.

A comparator now compares both sets of data, i.e. the predefined or intended or theoretical position of the engraved pattern according to the (not yet calibrated) laser system and the (real) position according to the picture taken by the (calibrated) camera. The controller thus determines the difference between these two positions, i.e. the offset of the laser system, especially the difference between the theoretical position according to the laser and the real position captured with the camera. The controller is set up to use this difference to now calibrate the laser, preferably to modify the control of the laser for the future engraving of the product.

With this system, there is no need of a calibration card or a step of comparing the data to other data stored or any test product. With this invention, the calibration of both systems, i.e. the optical system and the laser system can be accomplished during operation. Thus, even when there is thermal shift or other influences during the production, this system allows for recalibration "on the fly" without the need of any further elements like calibration cards or test products to be used and removed from the system.

In a preferred embodiment, the reference grid of the plate comprises holes and the position of these holes are used as the reference grid of the plate. The holes are for holding a product by vacuum and sucking air through these holes thus fixing the product and the positions of the holes is well known and thus, the offset of the camera image is determined and used to calibrate the camera.

In a further preferred embodiment, the controller is set up to have the laser engrave a further predefined pattern on a product situated on the plate next to an existing marking on a product, and to have the (calibrated) camera to capture the position of this engraved further pattern as well as the existing marking on the product and the controller is set up to have the comparator to compare the position of the engraved further predefined pattern and the position of the existing marking on the product according to the camera and to determine a difference between these two positions, wherein the controller is set up to use this difference to further calibrate the laser.

With the further predefined pattern on a product on the plate, next to an existing marking on a product, the calibration of the laser system can be carried out during production. This is advantageous when it has to be made sure that the engraving of a pattern or structure according to a picture is aligned all the time—even if there are effects like thermal shift or misalignment over time. This can occur during days, weeks or months. The laser performs a small defined engraving (further predefined pattern) before the engraving job is carried out. The position of this engraving is measured and compared to a pre-printed element and the calculated offset of the defined engraving and the pre-printed element is used to correct (recalibrate) the laser and do the final engraving.

Thus, it is made sure that the engraving of an image or pattern to a preprinted structure or pattern is aligned all the time—even if there are effects like thermal drift or misalignment over time. The laser performs a small defined engraving—the position of this engraving is measured and compared to a pre-printed element—the calculated offset of the defined engraving and the pre-printed element is used to correct or recalibrate the laser and do the final engraving. With this re-calibrating of the laser system, dynamic misalignment or shift can be compensated and the quality of the engraving can be ensured over time without the need of a full calibration procedure.

The object of the invention is also achieved by a method of calibrating a laser engraver, the laser engraver comprising a laser and a camera and a plate for holding a product to be engraved, the plate comprising a (preferably pre-measured) reference grid, wherein an optical path of the laser is directed to the plate and an optical path of the camera is directed to the plate and the optical path of the camera to the plate and the optical path of the laser to the plate are at least partially the same before and when hitting the plate, a calibration system with a controller, and a comparator, wherein the controller uses the reference grid (with no product on it) of the plate to calibrate the camera and wherein a predefined pattern is engraved on a product on the plate by the laser and the (calibrated) camera captures the position of this engraved pattern and the predefined position of the engraved pattern and the position according to the (calibrated) camera are compared and a difference between these two positions is determined, i.e. the difference between the theoretical position according to the laser and the real position captured with the camera and that this difference is used to calibrate the laser.

In a preferred embodiment, the reference grid of the plate comprises holes and the position of these holes are used as the reference grid of the plate. The holes are for holding a product by vacuum and sucking air through these holes thus fixing the product and the positions of the holes is well known and thus, the offset of the camera image is determined and used to calibrate the camera.

In a further embodiment, a further predefined pattern is engraved on a product on the plate next to an existing marking on a product and the position of this engraved further predefined pattern and the existing marking on the product are captured (by the camera) and the position of the engraved further predefined pattern and the position of the existing marking on the product according to the camera are compared and a difference between these two positions is determined, wherein this difference is used to further calibrate the laser.

The advantage is that the laser performs a small engraving and the position of this engraving on the product is then measured in respect to the position of the pre-printed pattern and the resulting offset is used to correct the position of the final engraving.

A preferred application uses a pre-printed element as a fiducial. The position offset of this fiducial is measured using the vision system. A (small) offset corrected engraving is placed close by [in the near vicinity of] the pre-printed element. If this engraving of the element is done before the actual image engraving, the position of this small engraving can be measured as well as the position of the pre-printed element. The difference between those positions indicates the misalignment between camera and laser and can be used to correct the position of the main image engraving.

BRIEF DESCRIPTION OF THE DRAWINGS

The invention is explained in more details with respect to the enclosed figures. The figures show.

DETAILED DESCRIPTION

Figure 1:
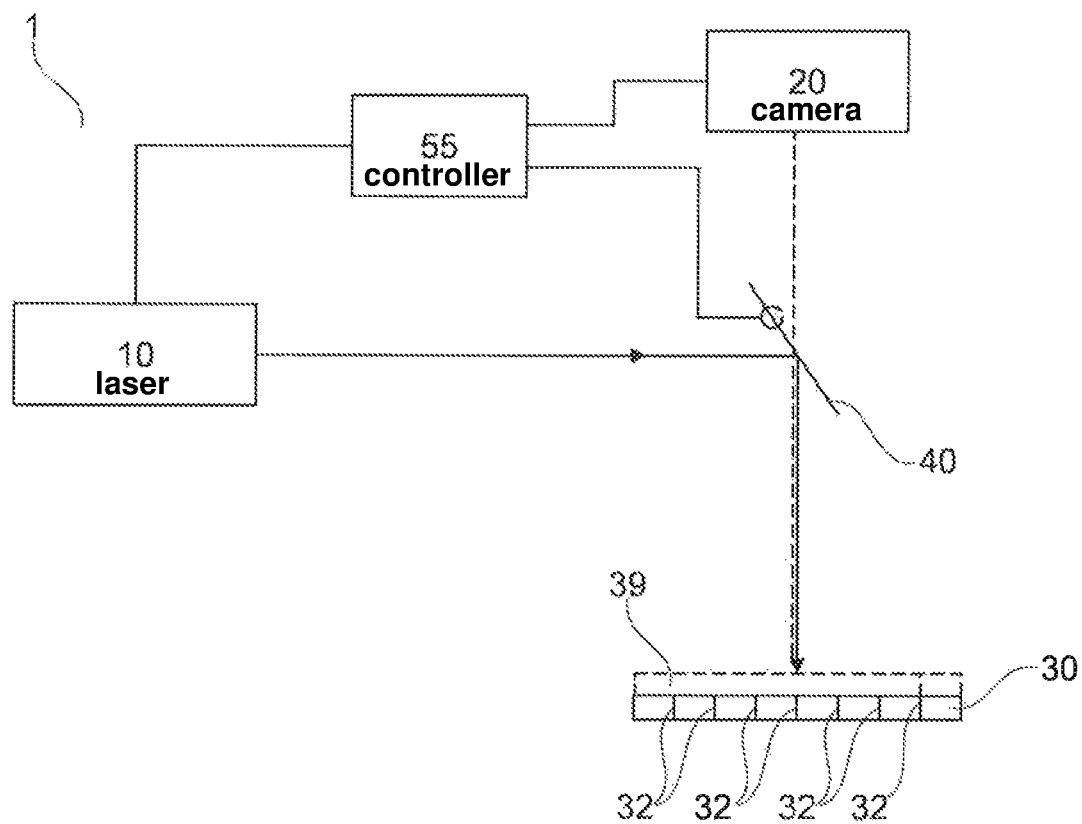
FIG. 1 a laser engraver with a camera and a laser
FIG. 2 a plate for holding a product with holes
FIG. 3a pre-printed structure with center omission
FIG. 3b pre-printed structure with the engraved element in the center of the pre-printed structure in perfect alignment
FIG. 3c pre-printed structure with the engraved element in the center of the pre-printed structure with off-set

In FIG. 1, a laser engraver 1 with a camera 20 and a laser 10 is shown. The optical path of the laser 10 leads from the laser 10 via the mirror 40 to the plate 30. The optical path of the camera 20 leads from the camera through the mirror 40 to the plate 30. Both optical paths of the laser 10 and the camera 20 are the same after the mirror 40. The plate 30 is provided to hold a product 39 by means of holes 32.

In a first step, the product 39 is not situated on the plate 30. The camera 20 captures the positions of the holes 32 of the plate 30 and uses them as reference. From these known positions of the holes 32 and the actual picture captured by the camera 20, the controller 55 calibrates the camera 20. In a second step, the product 39 is positioned on the plate 30 and fixed by vacuum applied to the product 39 by air being sucked through the holes 32 thus fixing the product 39 on the plate 30. The laser 10 applies a pattern on the product for predefined coordinates. The camera 20 captures the image and position of this pattern on the product and from the difference between the intended coordinates and the coordinates captured by the camera 20, the controller calibrates the laser system, i.e. the laser 10 and the mirror 40. As a result, both the camera 20 and the laser 10 are calibrated without the use of calibration cards in situ.

By this laser engraver system it is possible to correct all the errors and distortions which cause the engraving/marking position to be in-accurate. This laser engraver system makes use of one pre-measured reference grid and all other calibrations are derived from this, without the need for additional measuring by hand.

On a laser engrave system with an integrated camera, where the camera uses the same optical path as the laser beam, the galvo angle to the position in the workfield is calibrated using a known reference grid in the workfield. By centering the positions of the reference points in the grid on the camera sensor the galvo angle to position is calibrated. This centering is done by means of galvo angle. This calibration then can be used to measure the distortions of the engraved/marked workfield, creating a workfield deformation calibration. The procedure results in a calibration preferably using many orders of polynomial fitting to achieve micron accuracy over a 120 mm square workfield. This procedure eliminates the human action to measure distances to make a workfield calibration.

Figure 2:
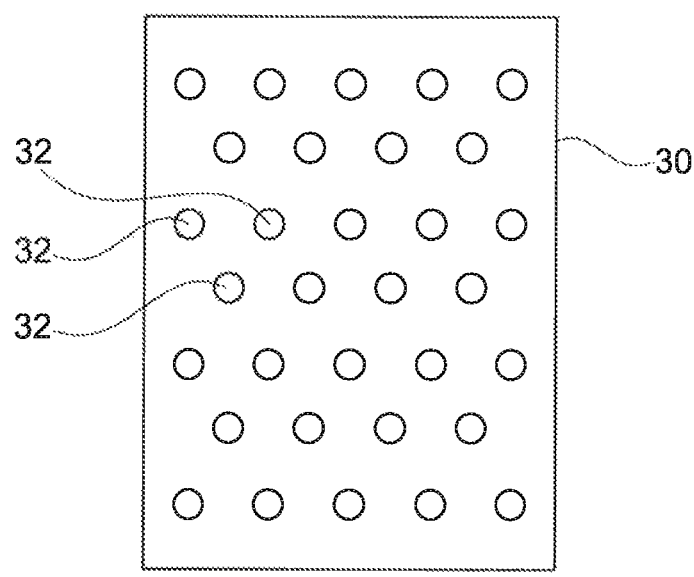

In FIG. 2, a plate 30 with holes 32 for holding a product 39 is shown from above. Thus, FIG. 2 shows the view of the optical axis of the camera 20 onto plate 30. On plate 30 the holes 32 can be seen as they form a pattern with predefined distances to each other. Thus, this pattern of holes can be used as a reference grid for the calibration of the camera 20.

Figure 3A:
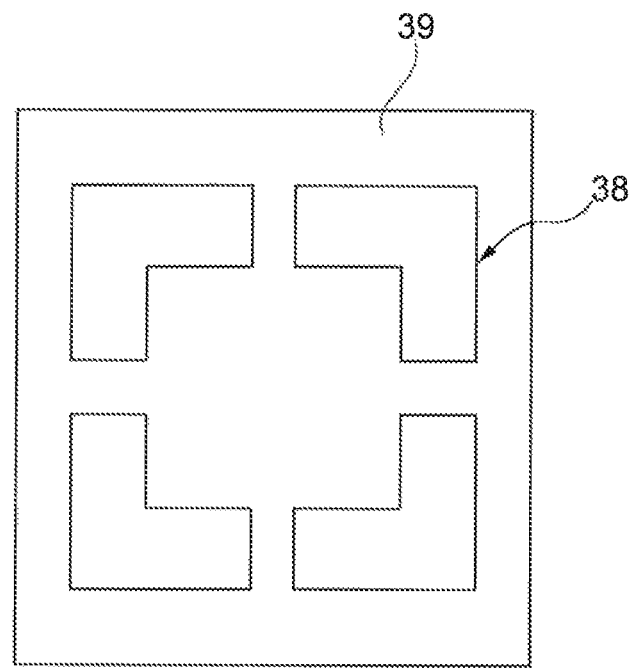
Figure 3B:
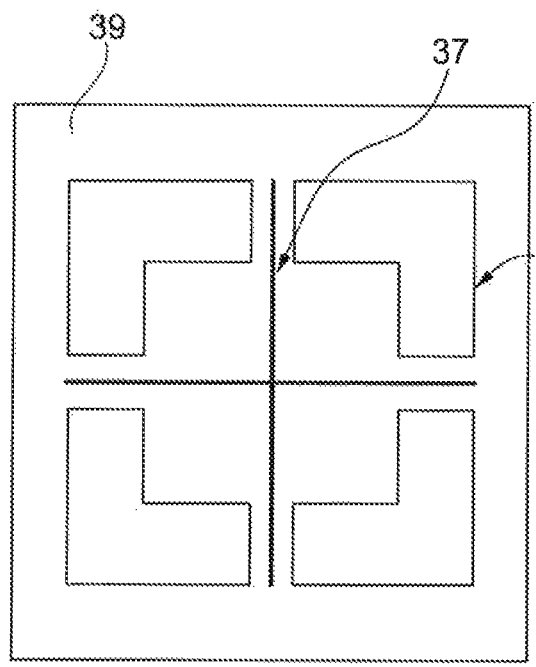
Figure 3C:
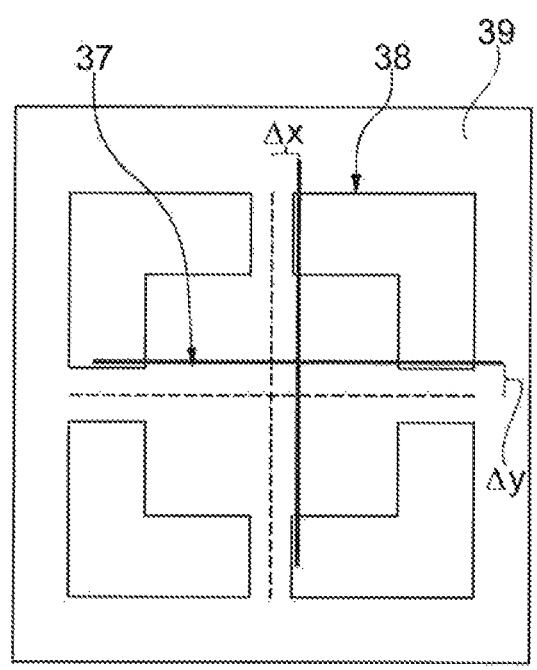

In FIG. 3a a product 39 with a pre-printed structure 38 with an engraved element 37 and in FIGS. 3b and 3c a pre-printed structure 38 with the engraved element 37 in the center of the pre-printed structure is shown.

In FIG. 3a a pre-printed structure 38 is shown. The center element has an omission in the middle. This omission is to be filled by an engraving of the laser.

In FIG. 3b, the image of FIG. 3a is shown with the engraving 37 in the center of the pre-printed structure 38. The engraving 37 is a cross and fits exactly in the pre-printed structure 38.

In FIG. 3c, the image of FIG. 3a is shown with the engraving 37 in the center of the pre-printed structure 38 but the engraving 37 has an offset with respect to the perfectly aligned position compared to FIG. 3b. As can be seen from FIG. 3c, this engraving 37 does not exactly fit in the pre-printed element 38 but rather has an offset of delta x and delta y. With this information, the laser system can be calibrated on the fly before the final engraving is done.

Thus, a system is provided with which it is possible to re-calibrate the laser system, i.e. laser and mirrors, in situ without the need of an additional calibrating step and the processing of calibration cards.

The position of both the pre-printed and the engrave element are measured and the difference between these two is determined. This position difference is a measure for the misalignment of the system. In the next step of the process, on the same product, the position of the main image is corrected with the misalignment difference and then engraved, resulting in a perfect alignment between laser and pre-printed elements with a large tolerance for the system misalignment.

The benefit of measuring the position of a small engraving before the actual engrave action is that every image can be compensated for and the demands for the mechanical setup as well as the drift and other stability related parameters of the components could be less tight.

Thus, a system is provided for in-situ calibration and an option for re-calibration without the need of a calibration procedure outside the marking or engraving of the products.

LIST OF REFERENCE SIGNS 1 laser engraver
10 laser
20 camera
30 plate
32 hole in plate
35 predefined reference grid on plate
36 first predefined pattern on product
37 further predefined pattern on product
38 existing marking on product
39 product
40 mirror
50 calibration system 55 controller
57 comparator

The invention claimed is:

1. A laser engraver comprising:
a laser;
a camera;
a plate for holding a product to be engraved, the plate comprising a reference grid, wherein:
an optical path of the laser is directed to the plate;
an optical path of the camera is directed to the plate; and
the optical path of the camera to the plate and the optical path of the laser to the plate are at least partially aligned before and when hitting the plate; and
a calibration system comprising:
a controller; and
a comparator;
wherein the controller is configured to:
use the reference grid of the plate to calibrate the camera;
have the laser engrave a pattern at a predefined position on the product on the plate to form an engraved pattern on the product and to have the camera capture a position of the engraved pattern;
have the comparator compare the predefined position and the position of the engraved pattern captured by the camera to determine a difference therebetween; and
calibrate the laser by modifying parameters of the laser based on the difference to correct alignment of the laser for future engraving of the product.

2. The laser engraver of claim 1, wherein the reference grid of the plate comprises holes in the plate.

3. The laser engraver of claim 2, further comprising a vacuum sucking air through the holes in the plate, thereby fixing the product relative the plate.

4. The laser engraver of claim 2, wherein the holes in the plate form a pattern with predefined distances between the holes.

5. The laser engraver of claim 1, wherein the controller is further configured to:
have the laser engrave a further pattern on the product on the plate next to an existing marking on the product to form a second engraved pattern on the product and to have the camera capture a position of the second engraved pattern and the existing marking on the product;
have the comparator compare the position of the second engraved pattern captured by the camera and the position of the existing marking on the product captured by the camera to determine a second difference therebetween; and
use the second difference to further calibrate the laser.

6. The laser engraver of claim 1, wherein the optical path of the laser and the optical path of the camera are each directed through a same optical element.

7. The laser engraver of claim 6, further comprising a plurality of optical elements and wherein the optical path of the laser and the optical path of the camera are each directed through a same plurality of optical elements.

8. A method of calibrating a laser engraver, the laser engraver comprising:
a laser;
a camera;
a controller; and
a plate for holding a product to be engraved, the plate comprising a reference grid, wherein:
an optical path of the laser is directed to the plate;
an optical path of the camera is directed to the plate; and
the optical path of the camera to the plate and the optical path of the laser to the plate are at least partially aligned before and when hitting the plate; and
the method comprising:
using the controller to calibrate the camera using the reference grid of the plate with no product on it;
using the controller to engrave a pattern at a predefined position on a product on the plate with the laser to form an engraved pattern on the product and using the camera to capture a position of the engraved pattern;
using the controller to compare the predefined position of the engraved pattern and the position of the engraved pattern captured by the camera to determine a difference therebetween; and
using the controller to calibrate the laser by modifying parameters of the laser based on the difference to correct alignment of the laser for future engraving of the product.

9. The method of claim 8, wherein the reference grid of the plate comprises holes in the plate.

10. The method of claim 9, further comprising using a vacuum to suck air through the holes in the plate, thereby fixing the product relative the plate.

11. The method of claim 9, wherein the holes in the plate form a pattern with predefined distances between the holes.

12. The method of claim 8, further comprising:
using the controller to engrave a further pattern with the laser on the product on the plate next to an existing marking on the product to form a second engraved pattern on the product and using the camera to capture a position of the second engraved pattern and a position of the existing marking on the product;
using the controller to compare the position of the second engraved pattern captured by the camera and the position of the existing marking on the product captured by the camera to determine a second difference therebetween; and
using the controller to further calibrate the laser based on the second difference.

13. The method of claim 8, further comprising directing the optical path of the laser and the optical path of the camera through a same optical element.

14. The method of claim 13, wherein the laser engraver further comprises a plurality of optical elements and the method comprises directing the optical path of the laser and the optical path of the camera through a same plurality of optical elements.

15. The method of claim 8, further comprising, subsequent calibrating the laser, using the controller to engrave an image on the product on the plate with the laser.

16. A laser engraver comprising:
a laser;
a camera;
a plate for holding a product to be engraved wherein:
an optical path of the laser is directed to the plate;
an optical path of the camera is directed to the plate; and
the optical path of the camera to the plate and the optical path of the laser to the plate are at least partially aligned before and when hitting the product; and a calibration system comprising:
- a controller; and
- a comparator;
- wherein the controller is configured to:
  - have the laser engrave a pattern on the product on the plate next to an existing marking on the product to form an engraved pattern on the product and to have the camera capture a position of the engraved pattern and the existing marking on the product;
  - have the comparator compare the position of the engraved pattern and the position of the existing marking on the product captured by the camera to determine a difference therebetween; and
  - calibrate the laser by modifying parameters of the laser based on the difference to correct alignment of the laser for future engraving of the product.

17. The laser engraver of claim 16, wherein the existing marking on the product is a printed marking.

18. The laser engraver of claim 16, wherein the optical path of the laser and the optical path of the camera are each directed through a same optical element.

19. The laser engraver of claim 18, further comprising a plurality of optical elements and wherein the optical path of the laser and the optical path of the camera are each directed through a same plurality of optical elements.

20. The laser engraver of claim 16, wherein the controller is further configured to, subsequent calibrating the laser based on the difference, engrave an image on the product on the plate with the laser.

* * * * *